(12) United States Patent
Prinsen

(10) Patent No.: US 10,203,021 B2
(45) Date of Patent: Feb. 12, 2019

(54) DRIVE BELT WITH A CARRIER RING AND TRANSVERSE SEGMENTS

(71) Applicant: Lucas Hendricus Robertus Maria Prinsen, Rijen (NL)

(72) Inventor: Lucas Hendricus Robertus Maria Prinsen, Rijen (NL)

(73) Assignee: ROBERT BOSCH GMBH, Stuttgart (DE)

( * ) Notice: Subject to any disclaimer, the term of this patent is extended or adjusted under 35 U.S.C. 154(b) by 93 days.

(21) Appl. No.: 15/392,307

(22) Filed: Dec. 28, 2016

(65) Prior Publication Data

US 2017/0184179 A1 Jun. 29, 2017

(30) Foreign Application Priority Data

Dec. 28, 2015 (NL) ...................................... 1041650

(51) Int. Cl.
*F16G 5/16* (2006.01)

(52) U.S. Cl.
CPC ............... *F16G 5/16* (2013.01); *F16G 5/163* (2013.01)

(58) Field of Classification Search
CPC .................................. F16G 5/16; F16G 5/163
USPC ....................................................... 474/242
See application file for complete search history.

(56) References Cited

U.S. PATENT DOCUMENTS

| 4,655,732 | A | * | 4/1987 | Takashima | F16G 5/166 |
| | | | | | 474/201 |
| 4,915,677 | A | * | 4/1990 | Simon | F16G 5/16 |
| | | | | | 474/242 |
| 6,440,024 | B1 | * | 8/2002 | Kobayashi | F16G 5/16 |
| | | | | | 474/242 |
| 6,565,469 | B1 | * | 5/2003 | Aoyama | F16G 5/16 |
| | | | | | 474/240 |

(Continued)

FOREIGN PATENT DOCUMENTS

| EP | 0 329 206 A1 | 8/1989 |
| EP | 0 626 526 A1 | 11/1994 |
| EP | 1 531 284 A1 | 5/2005 |

(Continued)

OTHER PUBLICATIONS

NL Search Report, dated Sep. 13, 2016, from corresponding NL application.

*Primary Examiner* — Michael R Mansen
*Assistant Examiner* — Mark K Buse
(74) *Attorney, Agent, or Firm* — Young & Thompson

(57) ABSTRACT

The disclosure relates to a transverse segment (33) for a drive belt with a carrier ring and with a plurality of these transverse segments (33) that are placed slideably on the carrier ring, which transverse segments (33) are provided with main body surfaces (38, 41), where between the transverse segment (33) extends in thickness direction, one main body surface (38) being provided with a rocking edge (42) that defines a transition between an upper side and a tapered lower side of the transverse segment (33) with a (Continued)

lowermost edge (34). The lower side of the transverse segment (33) includes at least one opening (44) and at least an upper, radially outward limiting boundary surface (46) of the opening (44) is provided with an undulating shape, i.e. is provided with multiple protrusions (47) that protrude generally towards the lower, radially inward limiting boundary surface (46) of the opening (44).

2 Claims, 2 Drawing Sheets

(56) References Cited

U.S. PATENT DOCUMENTS

| | | | |
|---|---|---|---|
| 2004/0072644 A1* | 4/2004 | van Lith | F16G 5/16 474/242 |
| 2004/0176202 A1* | 9/2004 | Sakai | F16G 5/16 474/242 |

FOREIGN PATENT DOCUMENTS

| | | |
|---|---|---|
| EP | 2 938 904 | 5/2005 |
| JP | S60 47940 U | 4/1985 |
| JP | H06 94082 A | 4/1994 |
| WO | 2014/102278 A1 | 7/2014 |

\* cited by examiner

DRIVE BELT WITH A CARRIER RING AND TRANSVERSE SEGMENTS

FIELD OF THE INVENTION

The present invention relates to a drive belt for a continuously variable transmission for motor vehicles, as defined in the preamble of claim 1.

BACKGROUND OF THE INVENTION

Such a drive belt is well-known and is, for instance, described in the European patent applications EP-A-0 329 206 and EP-A-0 626 526. The known drive belt is composed of a plurality of transverse segments and at least one endless or ring-shaped carrier that extends through a recess of each of the segments such that these are supported thereby. The transverse segments are neither fixed to one another nor to the carrier ring, such that they can move relative to the carrier at least in the circumferential or length direction thereof. In the drive belt, adjacent transverse segments abut one another through their respective front and back main body surfaces, which main body surfaces face, at least predominantly, in the said circumferential direction. Typically the transverse segments and the carrier ring are made of steel. The carrier ring is typically composed of a number of individual bands that are narrowly fitted one around the other.

In the known design of the transverse segment three basic portions can be recognised, namely an essentially trapezoidal base portion, a head portion and a web portion provided in-between and connecting the base portion and the head portion. A width dimension of the web portion is less than a corresponding width of the base portion and the head portion, whereby the said recess, where through the carrier extends in the drive belt, is defined between the said base and head portions.

On either side of the base portion the known transverse segment is provided with a friction surface, which friction surfaces are mutually oriented at an angle that is narrowly controlled in manufacture. By means of these friction surfaces the transverse segments of the drive arrive in (frictional) contact with a driving pulley and a driven pulley of the transmission such that a rotation of the driving pulley can be transferred to the driven pulley via the likewise rotating drive belt. Further, the base portion is provided with a so-called rocking edge in the form of a convexly curved part of one of its main body surfaces, which convex surface part extends width-wise from one axial side of the base portion to the other, i.e. in-between the said friction surfaces thereof. In the drive belt radially inward from, i.e. below the rocking edge, the base portion of the transverse segment is tapered, at least effectively. Together, the rocking edge and such tapered bottom side of the transverse segments, allow adjacent segments in the drive belt to mutually rotate while remaining in mutual contact at the location of the rocking edge, whereby the drive belt curves in the length direction thereof.

It is also known to provide the base portion with one or more cut-troughs, i.e. holes, in the parts thereof below the rocking edge. Such holes can serve multiple purposes, such as to reduce the weight of the transverse segment (and thus also of the drive belt as a whole) and/or to improve the lubrication and/or cooling properties of the drive belt during operation thereof in the transmission, which latter purpose is the topic of the European patent application EP-A-2938904. According to this EP-A-2938904 the effort required to circulate lubrication/cooling oil during operation, i.e. drive belt rotation, can be favourably reduced by providing the transverse segment with an appropriate shape, number, size and/or position of such holes.

SUMMARY OF THE INVENTION

The present disclosure departs from such known transverse segment with holes provided in its base portion and aims to further improve the design thereof. In particular according to the present disclosure the holes can serve a further purpose, in respect whereof their design can still be optimised. The drive belt according to the present disclosure is defined in the set of claims that is attached hereto. In particular according to the present disclosure, at least one of an upper, i.e. radially outward limiting surface or a lower, i.e. radially inward limiting surface of one or more of the holes is provided with one or more undulations. By such undulation or undulations the surface area of the respective surface of the respective hole or holes is increased such that a heat transfer from the transverse segment to its surrounding, i.e. the cooling thereof, is favourably improved.

In a more detailed embodiment of the transverse segment only one of the upper surface or the lower surface of the hole or holes is provided with one or more undulations. Hereby, the parts of the base portion of the transverse segments that are located closest to such undulated side of the hole will be cooled more effectively that such parts on the other, non-undulating, side of the hole(s).

This latter feature of the present disclosure is particularly useful in the manufacturing of the transverse segments. As part of such manufacturing, the transverse segments are typically quench hardened, which well-known process includes the process step of quenching after austenitizing. In quenching, the transverse segments are rapidly cooled down from the austenitizing temperature by immersion in a quenching medium such as oil, water or gas. Different parts of the transverse segment will experience different cooling rates, depending on their relative exposure to the quenching medium. In theory, even an unwanted, local plastic deformation may occur due to the resulting temperature differences throughout the transverse members. Obviously such plastic deformations are detrimental to the manufacturing accuracy of the transverse segments and possibly also to the operational performance of the drive belt as a whole. However, in practice no substantial problems have been reported in this respect, at least not within the teaching of the prior European patent application EP-A-1531284.

Underlying the present disclosure is the discovery that by providing the one or more holes in the base portion of the transverse segment, the local cooling rates in quenching can cause an unfavourable deformation of the transverse segments, at least in some specific designs thereof. In particular, the said angle between the friction surfaces was found to vary more than without such holes. For minimising or, potentially, for avoiding the said unfavourable deformation, it is presently proposed to provide only one of the upper surface or the lower surface of the holes with one or more undulations. In particular, these surface undulations are provided on the side of the holes where the local cooling rate of the base portion would otherwise (i.e. in the absence of such surface undulations) be less. More in particular, these surface undulations are provided on the upper surface. At least, for most existing designs of the transverse segment, a ratio between the volume and the outer surface area is higher for those parts of the base portion thereof that are located above the holes, as compared to those parts of the base portion thereof that are located below the holes. Thus, in this particular embodiment of the transverse segment, the undulations provided in the radially outward limiting surfaces of the holes help to equalize the cooling rate of the base portion of the transverse segment below and above the holes provided therein.

BRIEF DESCRIPTION OF THE DRAWINGS

The above technical principles underlying the present disclosure, as well as detailed embodiments of the transverse segment realised thereby are elucidated further by way of example on the basis of the description below with reference to the drawing, in which.

DETAILED DESCRIPTION OF THE INVENTION

In the figures, identical reference numbers relate to identical or at least comparable technical features.

Figure 1:
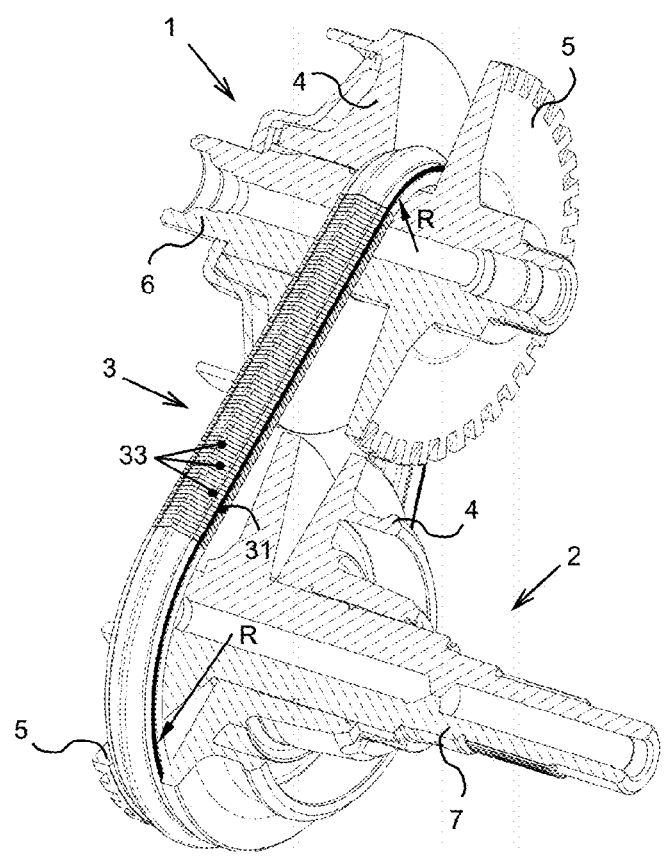
FIG. 1 provides a schematically representation of the known continuously variable transmission with two pulleys and a drive belt.

FIG. 1 shows the central parts of a known continuous variable transmission, as is commonly applied in the drive line of personal vehicles between the engine and the drive wheels thereof. The transmission comprises two pulleys 1, 2, each provided with two pulley sheaves 4, 5, and a drive belt 3 that is wrapped around the said pulleys 1, 2, located clamped between the respective pulley sheaves 4, 5 thereof. The pulley sheaves 4, 5 are shaped generally conical and at least one pulley sheave 4 is incorporated in the transmission axially moveable along a respective pulley shaft 6, 7 over which it is placed. The transmission also comprises activation means that impose on the said at least one sheave 4 an axially oriented force Fax directed towards the respective other pulley sheave 5, such that the belt 3 is clamped there between and a rotational movement and accompanying torque can be transmitted between the pulleys at a variable transmission ratio. During operation of the transmission, lubrication oil is circulated to reduce friction and to cool the moving parts thereof, such as the drive belt 3.

The drive belt 3 comprises at least one endless or ring-shaped carrier 31 and a number of transverse segments 33, with the carrier ring 31 extending through a recess 37 provided in the transverse segments 33, such that these are moveable along the circumferential direction of the carrier ring 31.

Figure 2:
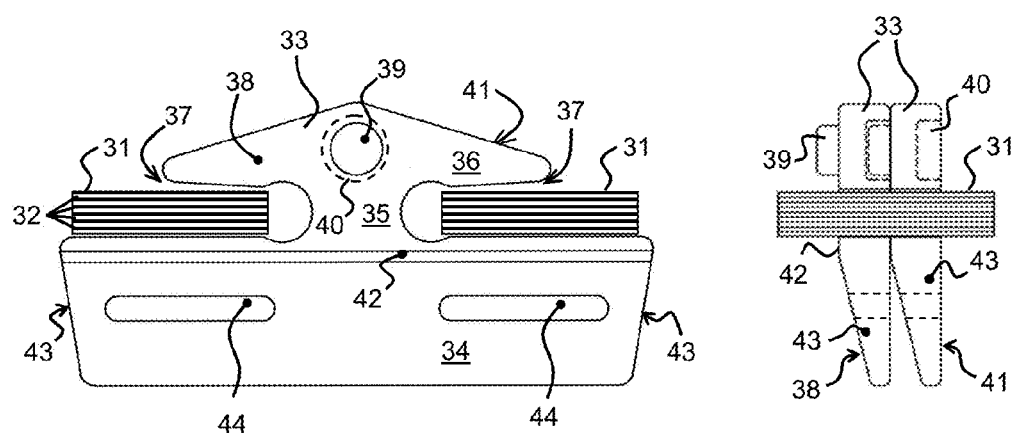
FIG. 2 illustrates a transverse segment of the drive belt according to FIG. 1, both in a front and in a side elevation thereof.

As is shown in more detail on the left-hand side of FIG. 2 in a cross-section of the drive belt 3, the carrier ring 31 consists of two parts 31, each such part being composed of a number of individual bands 32 that are narrowly fitted around one another. The transverse segments 33 are basically metal plates that are facing in the circumferential direction of the carrier ring 31. The transverse segments 33 comprises three basic portions, namely an essentially trapezoidal base portion 34, a head portion 36 and a web portion 35 provided in-between and connecting the base portion 34 and the head portion 36. A width dimension of the web portion 35 is less than a corresponding width of the base portion 34 and the head portion 36, whereby the said recess 37, where through the carrier ring 31 extends in the drive belt 3, is defined between the said base portion 34 and head portions 36 thereof. In the drive belt 3, adjacent transverse segments 33 abut one another through their respective front and rear main body surfaces 38, 41 as is shown for a pair of adjacent transverse segments 33 on the right-hand side of FIG. 2.

On either side of the base portion 34 thereof, the known transverse segment 33 is provided with a friction surface 43, which friction surfaces 43 are mutually oriented at an angle that is narrowly controlled in manufacture and which friction surfaces 43 serve to frictionally engage the pulley sheaves 4, 5 of the transmission pulleys 1, 2, at least during operation. Further, the known transverse segment 33 include a stud 39 projecting from the front main body surface 38 and a recess 40 provided in the back main body surface 41. In the drive belt 3, the stud 39 of a first transverse segment 33 of a pair of adjacent transverse segments 33 is at least partly inserted in the recess 40 of a second transverse segment 33 of such pair, whereby these transverse segments 33 mutually align each other perpendicular to the said circumferential direction.

To allow the drive belt 3 to bend, i.e. to follow a curved trajectory around the pulleys 1, 2, a radially innermost part of the transverse segments 33 tapers in radially inward direction, either gradually (such as illustrated on the right-hand side of FIG. 2), stepwise or a combination thereof. A transition surface 42 between such, at least effectively tapered, radially innermost part and another part of each respective transverse segments 33, located radially outward thereof and having a largely constant thickness, extends in the axial direction on the front main body surface 38 from one axial side of the base portion 34 to the other axial side, i.e. in-between the said friction surfaces thereof 43. This transition surface 42 is typically convexly curved and defines an axis of rotation between each pair of adjacent transverse segments 33. Such transition surface 42 is commonly referred to in the art as the rocking edge 42 of the transverse segment 33.

In the base portion 34 of the transverse segment 33 two cut-throughs, i.e. holes 44 are provided below, i.e. radially inward of the rocking edge 42. By the number and size of these holes 44 the weight of the transverse segment 33 (and thus also of the drive belt 3 as a whole) can be adjusted and/or a heat transfer away from the friction surfaces 43 to the lubrication oil can be influenced.

Figure 3:
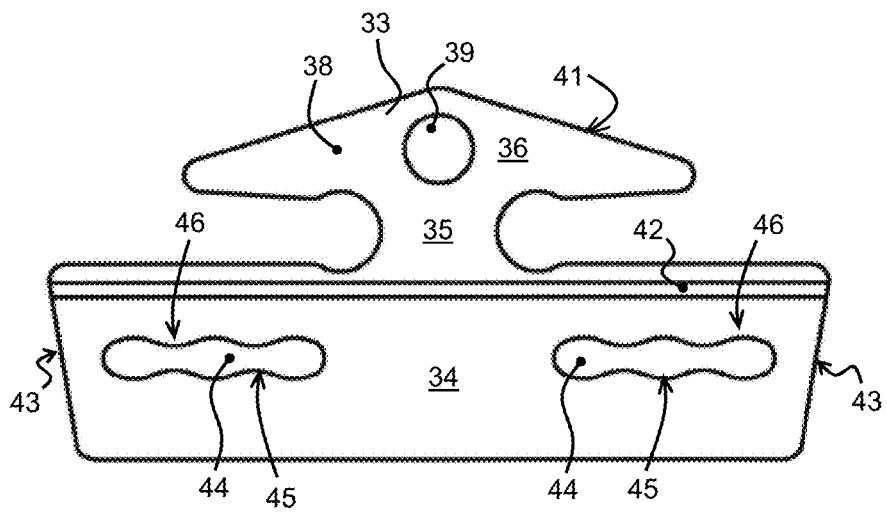
FIG. 3 provides a first novel embodiment of the transverse segment in a schematic front elevation thereof.

In a first novel embodiment of the transverse segment 33 that is illustrated in FIG. 3 in a schematic front elevation thereof the surfaces 45, 46 of the transverse segment 33 defining the holes 44 are provided with an undulating shape. Hereby the area of the external surface of the transverse segment 33, available for heat transfer away from the transverse segment 33 during operation, is increased, favourably without increasing the number or size of the holes 43 that would reduce the strength and/or stiffness of, in particular, the base portion 34 of the transverse segment 33.

Figure 4:
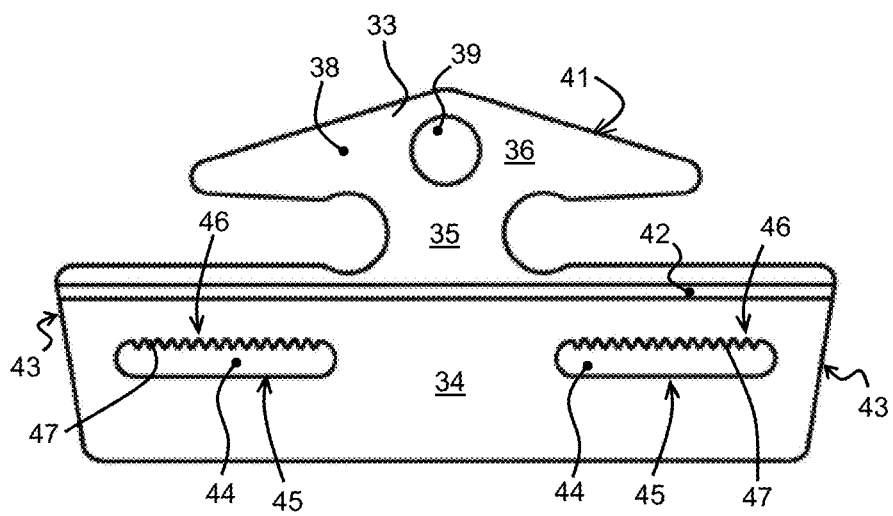
FIG. 4 provides a second novel embodiment of the transverse segment in a schematic front elevation thereof.

In a second novel embodiment of the transverse segment 33, that is illustrated in FIG. 4 in a schematic front elevation thereof, only an upper, radially outward limiting or boundary surface 46 of the holes 44 is undulated, i.e. is provided with multiple protrusions 47 extending in radially inward direction. A lower radially outward limiting or boundary surface 45 of the holes 44 is an essentially flat surface. In this second embodiment, parts of the base portion 34 of the transverse segment 33 located above, i.e. radially outwards of the holes 44 will be cooled more effectively that parts thereof located below the holes 34. Hereby, the tapered shape of the base portion 34 with more material above the holes 44 than below these holes 44 is taken into account and the cooling rate of those respective parts will be favourably more equal.

The present disclosure, in addition to the entirety of the preceding description and all details of the accompanying figures, also concerns and includes all the features of the appended set of claims. Bracketed references in the claims do not limit the scope thereof, but are merely provided as non-binding examples of the respective features. The claimed features can be applied separately in a given product or a given process, as the case may be, but it is also possible to apply any combination of two or more of such features therein.

The invention(s) represented by the present disclosure is (are) not limited to the embodiments and/or the examples that are explicitly mentioned herein, but also encompasses amendments, modifications and practical applications thereof, in particular those that lie within reach of the person skilled in the relevant art.

The invention claimed is:

1. A transverse segment (33) for a drive belt (3) with a carrier ring (31) and with a number of such transverse segments (33) that are slideably mounted on the carrier ring (31), the drive belt (3) forming a closed loop with an inner side and an opposite outer side, wherein each transverse segment (33) is a metal plate that comprises:
   two friction surfaces (43), wherein the transverse segment extends in a width direction between the two friction surfaces (43);
   two main body surfaces (38, 41), wherein the transverse segment extends in a thickness direction between the two main body surfaces (38, 41),
   wherein the transverse segment extends in a height direction, oriented perpendicular to both the width direction and the thickness direction, between an innermost part of the transverse segment with respect to the driving belt and an outermost part of the transverse segment with respect to the driving belt;
   wherein at least one of the two main body surfaces (38) is provided with i) a transition surface (42) that extends in the width direction and that forms a transition between the outermost part of the transverse segment (33) with a predominantly constant thickness and ii) the innermost part of the transverse segment (33) where a thickness of the innermost part of the transverse segment (33) reduces in the height direction away from the transition surface (42); and
   at least one opening (44) that is located in the innermost part of the transverse segment (33), the at least one opening (44) extending completely through the transverse segment (33) in the thickness direction of the transverse segment (33),
   wherein at least one of i) an upper boundary surface (46) of the at least one opening (44) located on a top side of the at least one opening (44) and ii) a lower boundary surface (45) of the at least one opening (44) located on a bottom side of the at least one opening (44) is provided with protrusions (47) that are undulating, and
   wherein only the upper boundary surface (46) of the at least one opening (44) is provided with the protrusions (47) and the lower boundary surface (45) is an essentially flat surface.

2. The transverse segment (33) of claim 1 wherein the metal plate is a steel plate.

* * * * *